United States Patent
Chuang et al.

(10) Patent No.: US 8,964,917 B2
(45) Date of Patent: Feb. 24, 2015

(54) SIGNAL TRANSMISSION DEVICE PERFORMING COMPENSATION BY FILTERING CHARACTERISTICS AND METHOD THEREOF, AND SIGNAL RECEPTION DEVICE OFFSETTING COMPENSATION AND METHOD THEREOF

(71) Applicant: Realtek Semiconductor Corporation, Hsinchu (TW)

(72) Inventors: Sheng-Fu Chuang, Taichung (TW); Liang-Wei Huang, Hsinchu (TW); Ching-Yao Su, Taichung (TW); Chun-Hung Liu, New Taipei (TW); Hsuan-Ting Ho, Taichung (TW); Cheng-Han Lee, New Taipei (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 14/102,083

(22) Filed: Dec. 10, 2013

(65) Prior Publication Data

US 2014/0177698 A1 Jun. 26, 2014

(30) Foreign Application Priority Data

Dec. 21, 2012 (TW) .............................. 101148916 A

(51) Int. Cl.
*H03K 7/02* (2006.01)
*H03K 9/02* (2006.01)
*H04L 25/497* (2006.01)
*H04L 25/03* (2006.01)
*H04L 25/49* (2006.01)

(52) U.S. Cl.
CPC ...... *H04L 25/4975* (2013.01); *H04L 25/03019* (2013.01); *H04L 25/4917* (2013.01)
USPC ............................................ 375/353; 327/50

(58) Field of Classification Search
USPC ......................................................... 375/353
See application file for complete search history.

(56) References Cited

U.S. PATENT DOCUMENTS

| | | | |
|---|---|---|---|
| 2004/0213354 A1* | 10/2004 | Jones et al. | 375/285 |
| 2005/0017883 A1* | 1/2005 | Lee | 341/118 |
| 2006/0045197 A1* | 3/2006 | Ungerboeck et al. | 375/261 |
| 2014/0036981 A1* | 2/2014 | Belge et al. | 375/227 |
| 2014/0254771 A1* | 9/2014 | Belge et al. | 379/1.04 |

* cited by examiner

*Primary Examiner* — Erin File
(74) *Attorney, Agent, or Firm* — WPAT, P.C.; Anthony King

(57) ABSTRACT

The present invention discloses a signal transmission device performing compensation by filtering characteristics for generating a transmission signal according to a pulse amplitude modulation signal. The signal transmission device comprises: a filtering characteristic compensation circuit for generating a compensation signal according to the pulse amplitude modulation signal and a filtering function; a filter coupled to the filtering characteristic compensation circuit for generating a filtered signal through filtering the compensation signal according to the aforementioned filtering function; and an analog front-end circuit for generating the transmission signal according to the filtered signal.

18 Claims, 7 Drawing Sheets

SIGNAL TRANSMISSION DEVICE PERFORMING COMPENSATION BY FILTERING CHARACTERISTICS AND METHOD THEREOF, AND SIGNAL RECEPTION DEVICE OFFSETTING COMPENSATION AND METHOD THEREOF

BACKGROUND OF THE INVENTION

1. Field of the Invention

The present invention relates to a signal transmission device and the method thereof and a signal reception device and the method thereof, especially to a signal transmission device performing compensation by filtering characteristics and the method thereof and a signal reception device offsetting compensation and the method thereof.

2. Description of Related Art

Generally speaking, an electronic product will produce electromagnetic radiation when functioning, which may interfere with the normal operation of other devices and even affect human health. Therefore, most countries set regulations on the electromagnetic radiation of electronic products to thereby prevent electromagnetic interference (EMI) from brining damage. In some field, the regulation on EMI is extremely restrictive. For instance, regarding an automotive network communication device, the frequency spectrum of transmission signals of such device should be confined to a low frequency band, so as to conform to the relevant automotive EMI regulations. On this topic, the current solution uses a low pass filter to filter the signal that is going to be transmitted by the aforementioned automotive network communication device, so as to confine the frequency spectrum of the transmitted signal to the low frequency band to thereby satisfy the relevant regulations. However, to the automotive network communication device, the confinement to the transmitted signal with the low frequency band also causes the loss of transmission distance and throughput. Hence, how to avoid the loss of signal transmission performance under EMI regulations is the subject of this technique filed and the present invention.

SUMMARY OF THE INVENTION

In view of the deficit of the prior art, a purpose of the present invention is to provide a signal transmission device performing compensation by filtering characteristics and the method thereof and a signal reception device offsetting compensation and the method thereof, so as to make improvements.

Another purpose of the present invention is to provide a signal transmission device performing compensation by filtering characteristics and the method thereof and a signal reception device offsetting compensation and the method thereof, so as to avoid or reduce the loss of signal transmission distance and throughput under EMI regulations.

The present invention discloses a signal transmission device performing compensation by filtering characteristics for generating a transmission signal in accordance with a source signal. According to an embodiment of this invention, the signal transmission device comprises: a filtering characteristic compensation circuit to generate a compensation signal according to the source signal and a filtering function; a filter, coupled to the filtering characteristic compensation circuit, to filter the compensation signal according to the filtering function and thereby generate a filtered signal; and an analog front-end circuit to generate the transmission signal according to the filtered signal.

According to an embodiment of the present invention, said source signal is a pulse amplitude modulation (PAM) signal, and said filtering characteristic compensation circuit includes: a calculation circuit to generate a calculation signal according to the PAM signal and a feedback signal; a level adjustment circuit, coupled to the calculation circuit, to generate the compensation signal according to the calculation signal in which the signal level of the PAM signal is between a signal level top and a signal level bottom while the level adjustment circuit performs level adjustment to the calculation signal if its signal level is above the signal level top or below the signal level bottom to thereby generate the compensation signal having the signal level between the signal level top and the signal level bottom; and a feedback circuit, coupled to the level adjustment circuit, to generate the feedback signal by processing the compensation signal according to a feedback function which is associated with the filtering function.

According to an embodiment of the present invention, the signal level of said PAM signal corresponds to one of 2M+1 signal levels. If the signal level of the calculation signal exceeds the signal level top, the level adjustment circuit lowers the signal level of the calculation signal for n×(2M+1) levels to thereby generate the compensation signal; and if the signal level of the calculation signal is below the signal level bottom, the level adjustment circuit raises the signal level of the calculation signal for n×(2M+1) levels to accordingly generate the compensation signal in which the n and the M are positive integers while the n is adjustable.

The present invention also discloses a signal reception device offsetting compensation. According to an embodiment of this invention, said signal reception device comprises: an analog front-end circuit to generate a reception signal according to a transmission signal which is compensated previously; and a level recovery circuit to perform level adjustment to the reception signal or the derived signal thereof which is above a signal level top or below a signal level bottom and thereby generate a pulse amplitude modulation (PAM) signal with a signal level between the signal level top and the signal level bottom, wherein the signal level of the PAM signal corresponds to one of 2M+1 signal levels. If the signal level of the reception signal or the derived signal thereof exceeds the signal level top, the level recovery circuit lowers the signal level of the reception signal or the derived signal thereof for n×(2M+1) levels; and if the signal level of the reception signal or the derived signal thereof is below the signal level bottom, the level recovery circuit raises the signal level of the reception signal or the derived signal thereof for n×(2M+1) levels in which the n and the M are positive integers while the n is adjustable.

The present invention further discloses a signal transmission method performing compensation by filtering characteristics, which generates a transmission signal according to a source signal and is carried out through a signal transmission device performing compensation by filtering characteristics. According to an embodiment of this invention, the signal transmission method comprises: generating a compensation signal according to a source signal and a filtering function; filtering the compensation signal according to the filtering function to thereby generate a filtered signal; and generating the transmission signal according to the filtered signal.

The present invention further discloses a signal reception method offsetting compensation, which receives a transmission signal and is carried out by a signal reception device capable of offsetting compensation. According to an embodiment of this invention, the signal reception method comprises: generating a reception signal according to the transmission signal; if the signal level of the reception signal or the derived signal thereof is above a signal level top, lowing the signal level of the reception signal or the derived signal thereof for n×(2M+1) levels to thereby generate a pulse amplitude modulation (PAM) signal in which the n and the M are positive integers while the n is adjustable; and if the signal level of the reception signal or the derived signal thereof is below signal level bottom, raising the signal level of the reception signal or the derived signal thereof for n×(2M+1) levels to thereby generate the PAM signal, wherein the signal level of the PAM signal is between the signal level top and the signal level bottom.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
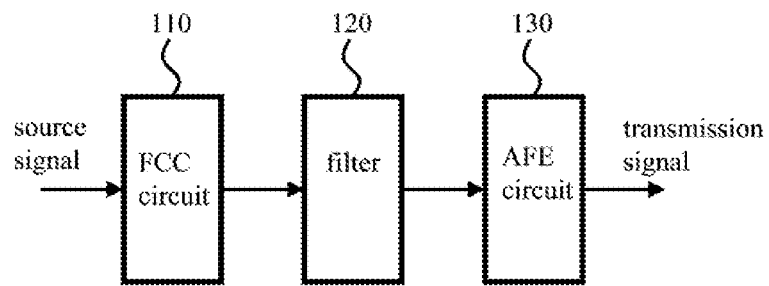
FIG. 1 illustrates the diagram of an embodiment of the signal transmission device performing compensation by filtering characteristics in accordance with the present invention.

The following description uses language by referring to terms of the filed of this invention. If any term is defined in the specification, such term should be explained accordingly. Besides, the connection between objects or events in the disclosed embodiments can be direct or indirect provided that these embodiments are still applicable under such connection. The mentioned "indirect" means that an intermediate object or a physical space is existed between the objects, or an intermediate event or a time interval is existed between the events. In addition, the following description relates to signal transmission and reception technique of a communication system, and thus the known detail in this filed will be omitted if such detail has little to do with the features of the present invention. Furthermore, the shape, size, and ratio of any element and the step sequence of any flow chart in the disclosed figures are just exemplary for understanding, not for limiting the scope of this invention.

Besides, each embodiment in the following description includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

The present invention contains a signal transmission device performing compensation by filtering characteristics and the method thereof and a signal reception device offsetting compensation and the method thereof. These circuits and methods are capable of filtering signals that are going to be transmitted under a regulation (e.g. an electromagnetic interference (EMI) regulation), and compensating the influence of the filtering operation at a transmission end and offsetting the compensation of the transmission end at a reception end. Please note that although this specification gives sufficient embodiments, if an implementation is applicable, people of ordinary skill in the art can still choose components or steps equivalent to those described in this specification to carry out the present invention, which means that the scope of this invention is not limited to the embodiments in the specification. Besides, since some or all elements of said signal transmission and reception devices could be known, the detail of such elements will be omitted provided that the omission nowhere dissatisfies the disclosure and enablement requirements. Similarly, since the signal transmission and reception methods of the present invention can be carried out by the devices of this invention or the equivalent devices thereof, the following description will abridge the hardware details related to the method provided that the remained disclosure is still enough for understanding and enablement.

Please refer to FIG. 1 which illustrates the diagram of an embodiment of the signal transmission device performing compensation by filtering characteristics in accordance with the present invention. This embodiment is applicable to a communication device (e.g. an Ethernet network communication device in compliance with 10 GBase-T standard), especially to a communication device having high requirements for the waveform and frequency spectrum of transmission signals. As shown in FIG. 1, the signal transmission device 100 of the present embodiment comprises: a filtering characteristic compensation (FCC) circuit 110 to generate a compensation signal according to a source signal and a filtering function; a filter 120, coupled to the filtering characteristic compensation circuit 110, to perform a filtering process to the compensation signal according to the filtering function and thereby generate a filtered signal; and an analog front-end (AFE) circuit 130, coupled to the filter 120, to generate the transmission signal according to the filtered signal. Please note that in this embodiment, said filtering characteristic compensation circuit 110 includes a Tomlinson-Harashima Precoder (THP) while the source signal is a pulse amplitude modulation (PAM) signal; however, other circuits that can be used to implement the filtering characteristic compensation circuit 110 and/or other signals that can be handled by the present invention are options for this invention. Besides, the mentioned filtering function is set in accordance with an EMI specification, so that the filtered signal can possess a specific waveform and/or a specific spectrum and therefore conform to the EMI specification.

Figure 2:
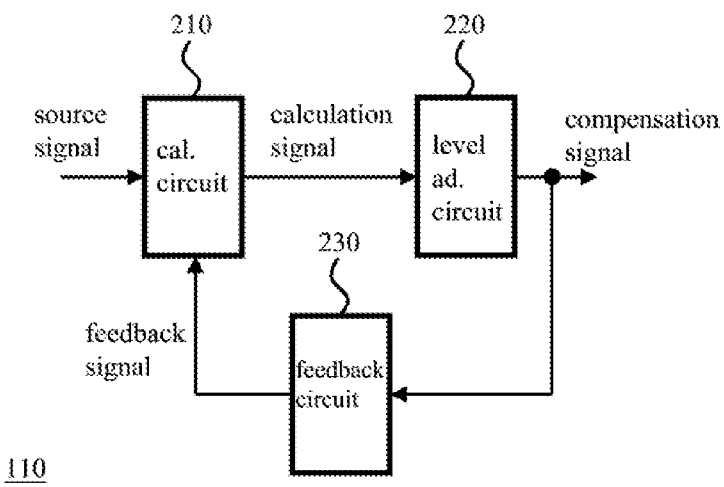
FIG. 2 illustrates an embodiment of the filtering characteristic compensation circuit in FIG. 1.

Please refer to FIG. 2 which illustrates the diagram of an embodiment of the filtering characteristic compensation circuit 110 of FIG. 1. As shown in FIG. 2, the filtering characteristic compensation circuit 110 includes: a calculation circuit (cal. circuit) 210 to generate a calculation signal according to the aforementioned source signal (i.e. the PAM signal in the present embodiment) and a feedback signal. In this embodiment, the calculation circuit 210 includes a subtraction circuit (not shown in the figure) to subtract the feedback signal from the PAM signal and thereby generate the calculation signal; however, this is not a limitation to the present invention, which means that those of ordinary skill in the art can select a circuit with other functions to implement the calculation circuit 210 by referring to the disclosure herein and in consideration of their demand or some standards. The filtering characteristic compensation circuit 110 further includes: a level adjustment circuit (level ad. circuit) 220, coupled to the calculation circuit 210, to generate the compensation signal according to the calculation signal; in the mean time, the signal level of the PAM signal is between a signal level top and a signal level bottom, and the level adjustment circuit 220 performs level adjustment to the calculation signal if the signal level thereof is above the signal level top or below the signal level bottom, so as to generate the compensation signal and make the signal level of the compensation signal stay between the signal level top and the signal level bottom. To be more specific, the signal level of the PAM signal corresponds to one of 2M+1 signal levels while the M is a positive integer (e.g. 2). Accordingly, if the calculation signal exceeds the signal level top, the level adjustment circuit 220 will lower the signal level of the calculation signal for n×(2M+1) levels to generate the compensation signal in which the n is a positive integer and adjustable; on the other side, if the signal level of the calculation signal falls below the signal level bottom, the level adjustment circuit 220 raises the signal level of the calculation signal for n×(2M+1) levels to generate the compensation signal. In this embodiment, the level adjustment circuit is a modulus operation circuit; however, other circuits which can carry out the mentioned level adjustment function are also applicable to the present invention. Additionally, the filtering characteristic compensation circuit 110 includes: a feedback circuit 230, coupled to the level adjustment circuit 220 and the calculation circuit 210, to generate the feedback signal according to the compensation signal and then provide the feedback signal for the calculation circuit 210. Said feedback circuit 230 corresponds to a feedback function which is associated with the aforementioned filtering function. In the present embodiment, the feedback function is equal to the filtering function minus 1. Therefore, under the presumption that the calculation signal is equivalent to the compensation signal, the relation between the two functions is shown below:

$$S(D) \times [1/E(D)] = S(D) - F(D)\{S(D) \times [1/E(D)]\}$$

$$\therefore F(D) = E(D) - 1$$

in which S(D) denotes the PAM signal; E(D) denotes the filtering function (which means that 1/E(D denotes the function of the filtering characteristic compensation circuit 110); S(D)[1/E(D)] denotes the output signal of the filtering characteristic compensation circuit 110; F(D) denotes the feedback function; and F(D)\{S(D)×[1/E(D)]\} denotes the feedback signal. Please note that although this embodiment adopts the above-described functional relation, people of ordinary skill in the art can still modify the feedback circuit 230 to realize other functional relations based on the disclosure of this specification and their demand or specific standards.

Figure 3:
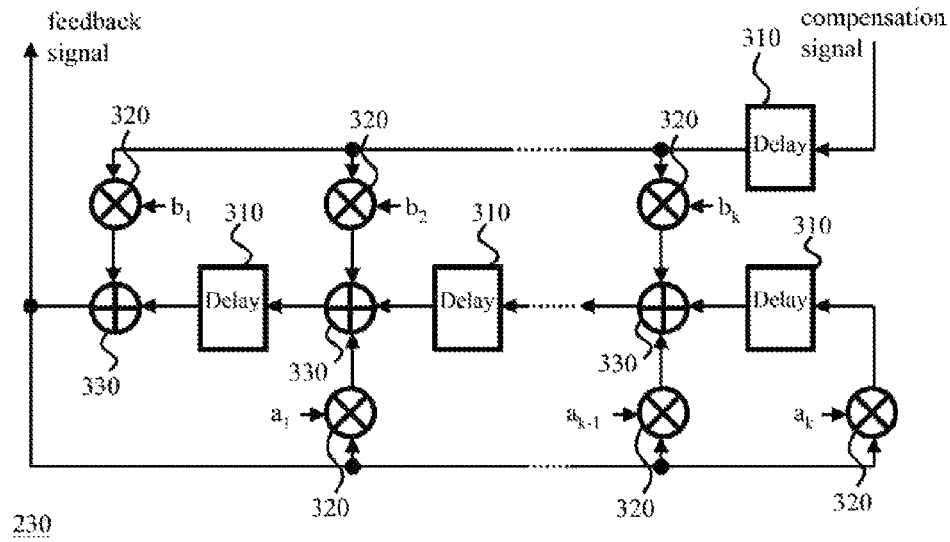
FIG. 3 illustrates an embodiment of the feedback circuit in FIG. 2.

In light of the above, an embodiment of the feedback circuit 230 is illustrated with FIG. 3, and comprises: a plurality of delay elements (Delay) 310, a plurality of multiplication elements 320; and a plurality of addition elements 330, wherein each of the multiplication elements 320 multiplies its received signal by a parameter and then output the multiplication result. Said parameters ($a_1$, $a_2$ . . . $a_{k-1}$, $a_k$ and $b_1$, $b_2$ . . . $b_{k-1}$, $b_k$ in which the suffix k is an integer) determine the feedback function of the feedback circuit 230. More specifically, by modifying these parameters, one can associate the feedback function with the aforementioned filtering function; and since the filtering function could be set by the designer, the parameters could also be set by the same designer in accordance with the filtering function. In this embodiment, the feedback function is shown by the following equation:

$$F(D) = E(D) - 1 = (b_1 D + b_2 D^2 + \ldots + b_k D^k)/(1 - a_1 D - a_2 D^2 - \ldots - a_k D^k)$$

in which D denotes the signal passing through one delay element; $D^2$ denotes the signal passing through two delay elements; and $D^k$ denotes the signal passing through k delay elements.

Please refer to FIG. 2 again. In the present embodiment, the feedback function only relates to the filtering function. Other effects (e.g. a channel effect) that will affect the transmission signal could be compensated by an equalizer at the reception end which receives the transmission signal. However, in another embodiment of the present invention, the feedback function could be further associated with a channel estimation function (or other functions that will affect the transmission signal). Said channel estimation function denotes the influence of a channel effect to the transmission signal. In this case, the filtering characteristic compensation circuit 110 compensates the filtering characteristic of the filter 120 and the influence of the channel effect according to the feedback function. More specifically, the feedback function here is equal to the composite function of the filtering and channel estimation functions minus 1.

Figure 4:
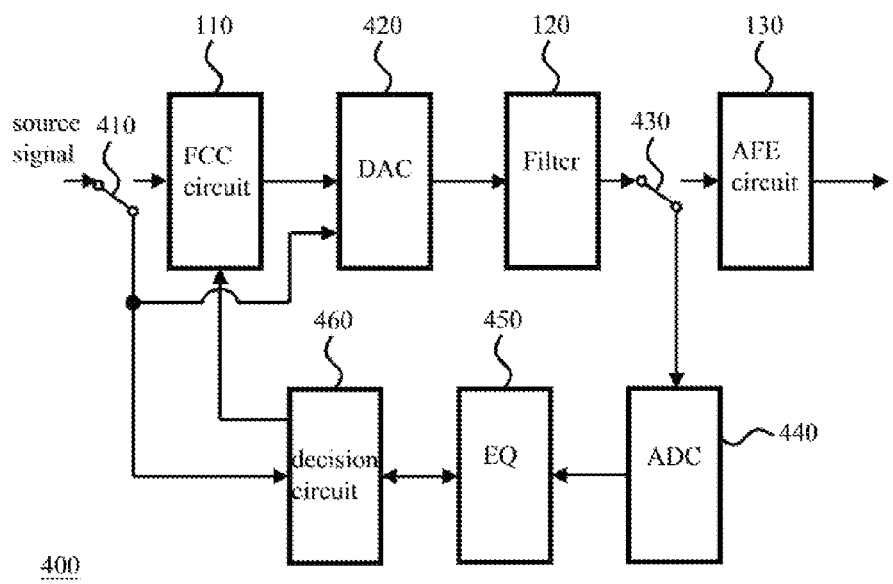
FIG. 4 illustrates the diagram of another embodiment of the signal transmission device performing compensation by filtering characteristics according to the present invention.

Please refer to FIG. 1 again. The present embodiment can further comprise: a digital-to-analog converter (e.g. the digital-to-analog converter (DAC) 420 in FIG. 4), coupled to the filtering characteristic compensation circuit 110, to perform digital-to-analog conversion to the compensation signal and output the converted compensation signal to the filter 120 for the following process; meanwhile, the filter 120 is an analog filter. However, because an analog filter could suffer a characteristic offset due to some factors (e.g. process variation, temperature variation, and etc.), therefore the present invention further provides the design capable of calibrating the characteristic offset. Please refer to FIG. 4 which illustrates the diagram of another embodiment of the signal transmission device performing compensation by filtering characteristics according to the present invention. As shown in FIG. 4, the signal transmission device 400 of this embodiment not only comprises the components of FIG. 1, but also comprises: a first switch 410 to electrically connect the source signal with the filtering characteristic compensation circuit 110 under a normal mode and electrically connect the source signal with a digital-to-analog converter 420 under a calibration mode; the digital-to-analog converter, coupled to the filtering characteristic compensation circuit 110, to perform digital-to-analog conversion to the compensation signal under the normal mode and then output the converted compensation signal to the filter 120 for going on the process as described in the embodiment of FIG. 1, and to receive the source signal through the first switch 410 under the calibration mode and then turn the source signal into an analog training signal which is outputted to the filter 120 afterwards while the filter 120 generates an analog filtered training signal according to the analog training signal consequently; a second switch 430 to electrically connect the filter 120 with the analog front-end circuit 130 under the normal mode and electrically connect the filter 120 with an analog-to-digital converter (ADC) 440 under the calibration mode; the analog-to-digital converter 440 to convert the analog filtered training signal into a digital filtered training signal under the calibration mode; an equalizer (EQ) 450 to generate an equalization signal according to the digital filtered training signal and an error feedback signal under the calibration mode in which said equalizer 450 includes at least one equalization parameter which is modified in accordance with the error feedback signal; and a decision circuit 460, coupled to the equalizer 450 and coupled to the source signal through the first switch 410 under the calibration mode, to generate the error feedback signal by using the source signal and the equalization signal and update at least one parameter (e.g. a parameter of the feedback circuit 230 of FIG. 3) of the filtering characteristic compensation circuit 110 according to the modified equalization parameter, so as to compensate the characteristic offset of the analog filter 120. In this embodiment, the decision circuit 460 is also coupled to the first switch 410 and the second switch 430 (in which the connection to the second switch is not shown), so as to control the two switches 410, 430 to return to the normal mode from the calibration mode after the calibration is done, or control the two switches 410, 430 to go to the calibration mode from the normal mode if such calibration is required. Please note that the described calibration process indicates that the parameter of the filtering characteristic compensation circuit 110 will be associated with the filtering function of the filter 120. Therefore, even though the parameter of the filtering characteristic compensation circuit 110 was not set by the filtering function in advance, it can still be associated with the filtering function through the calibration process.

In light of the above, in this embodiment, the equalizer 450 may further comprise: a feed-forward equalizer and a feedback equalizer (not shown in the figures). Said feed-forward equalizer generates a feed-forward equalization signal according to the digital filtered training signal and the error feedback signal, and includes at least one feed-forward equalization parameter which is modified according to the error feedback signal, so that the equalization effect of the feed-forward equalizer can be described by a feed-forward equalization function A(D). Said feedback equalizer is coupled to the feed-forward equalizer, and generates the aforementioned equalization signal according to the feed-forward equalization signal and the error feedback signal. The feedback equalizer includes at least one feedback equalization parameter which is modified according to the error feedback signal, so that the equalization effect of the feedback equalizer could be represented by a feedback equalization function B(D). Said at least one feed-forward equalization parameter and the at least one feedback equalization parameter then constitute the aforementioned equalization parameter while the feed-forward equalization function A(D) divided by the feedback equalization function B(D) equals the aforementioned filtering function E(D).

Please note that the filter 120 can not only be implemented with the aforementioned analog filter, but also a digital filter. For instance, the analog front-end 130 of FIG. 1 may comprise: a digital-to-analog converter (not shown in the figure), coupled to the filter 120, to perform digital-to-analog conversion to the filtered signal, so that the analog front-end 130 may generate the transmission signal according to the converted filtered signal; in the mean time, the filter 120 is a digital filter.

In addition to the disclosed signal transmission device, the present invention also provides a signal reception device 500 capable of offsetting the compensation caused by the signal transmission device, so that the signal reception device 500 can receive and process the transmission signal of FIG. 1 or FIG. 4. Said signal reception device 500 comprises: an analog front-end circuit 510 to generate a reception signal according to a transmission signal; and a level recovery circuit 520 to perform level adjustment to the reception signal or the derived signal thereof if its signal level exceeds a signal level top or falls below a signal level bottom and thereby generate a pulse amplitude modulation (PAM) signal which consequently possesses the signal level between the signal level top and the signal level bottom, wherein the signal level of the PAM signal corresponds to one of 2M+1 signal levels in which the M is a positive integer (e.g. 2). To be more specific, if the reception signal or it derived signal exceeds the signal level top, the level recovery circuit 520 will lower the signal level of the reception signal or its derived signal for n×(2M+1) levels in which the n is a positive integer (e.g. 1) and adjustable; on the other side, if the reception signal or the derived signal thereof is below the signal level bottom, the level recovery circuit 520 will raise the signal level of the reception signal or its derived signal for n×(2M+1) levels. In this embodiment, the level recovery circuit 520 is a modulus operation circuit; however, other circuits that can execute said level adjustment are also applicable to the present invention. Furthermore, this embodiment can further comprise: a channel equalizer (not shown in the figure), coupled to the analog front-end circuit 510, to generate the derived signal according to the reception signal, so as to compensate the influence of a channel effect to the transmission signal (which is turned into the reception signal afterward). Since the channel equalizer alone is well known in this technique filed, the more detail is therefore omitted here for conciseness.

Figure 6:
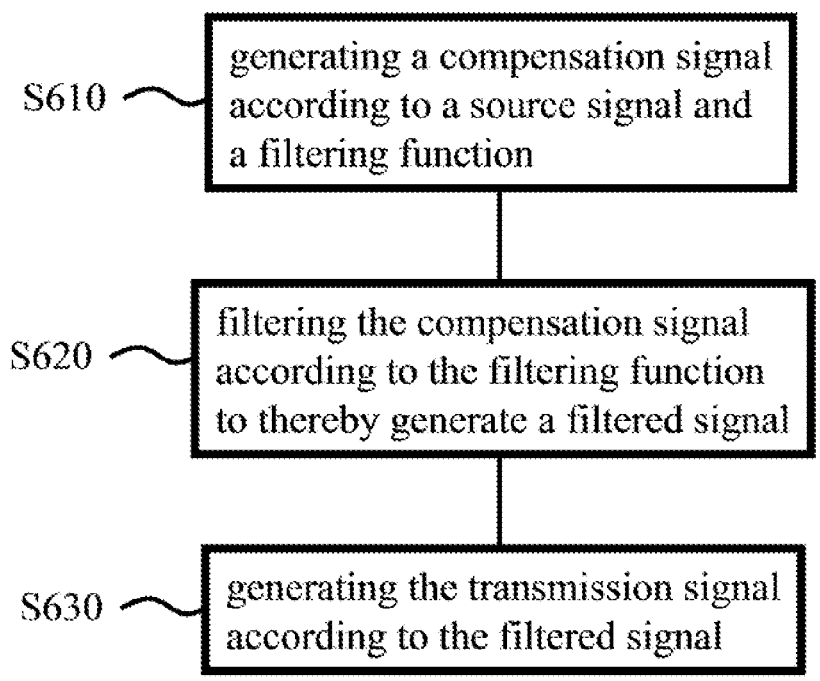
FIG. 6 illustrates the flow chart of an embodiment of the signal transmission method performing compensation by filtering characteristics according to the present invention.

Besides the aforementioned device embodiments, the present invention also discloses a signal transmission method performing compensation by filtering characteristics. This method can be executed by the signal transmission device of FIG. 1 or FIG. 4, or the equivalent device thereof. As shown in FIG. 6, an embodiment of the signal transmission method comprises the following steps:

Step S610: generating a compensation signal according to a source signal and a filtering function;
Step S620: filtering the compensation signal according to the filtering function to thereby generate a filtered signal; and
Step S630: generating the transmission signal according to the filtered signal.

Figure 7:
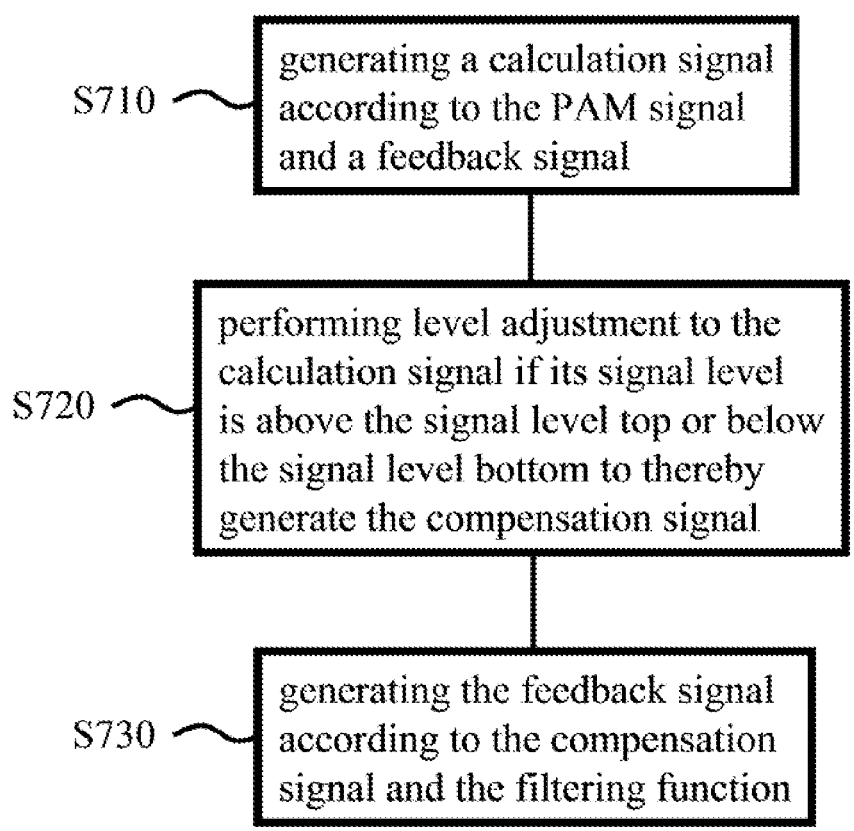
FIG. 7 illustrates the flow chart of an embodiment of step S610 in FIG. 6.

In this embodiment, the source signal is a pulse amplitude modulation (PAM) signal whose signal level is set between a signal level top and a signal level bottom. In view of this setting, step S610 can additionally include the following steps (as shown in FIG. 7):

Step S710: generating a calculation signal according to the PAM signal and a feedback signal.
Step S720: performing level adjustment to the calculation signal if its signal level is above the signal level top or below the signal level bottom to thereby generate the compensation signal, so that the signal level of the compensation signal will be restricted between the signal level top and the signal level bottom. More specifically, provided that the signal level of the PAM signal corresponds to one of 2M+1 signal levels in which the M is a positive integer (e.g. 2), if the signal level of the calculation signal exceeds the signal level top, step S720 will lower this signal level for n×(2M+1) levels in which the n is also a positive integer (e.g. 1) to thereby generate the compensation signal; on the other side, if the signal level of the calculation signal falls below the signal level bottom, step S720 will raise the signal level of the calculation signal for n×(2M+1) levels to thereby generate the compensation signal.

Step S730: generating the feedback signal according to the compensation signal and the filtering function.

Figure 8:
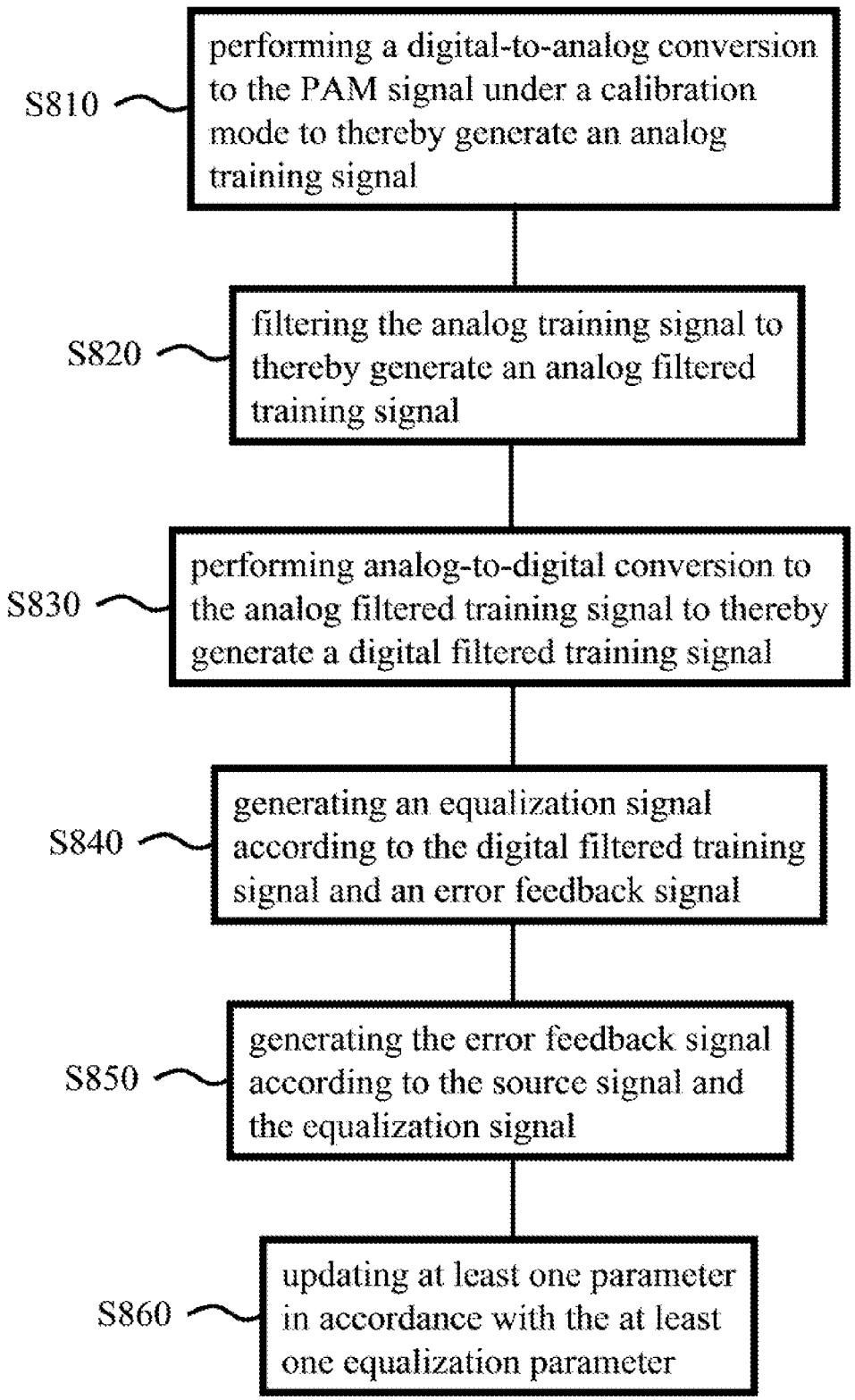
FIG. 8 illustrates the partial flow chart of another embodiment of the signal transmission method performing compensation by filtering characteristics in accordance with the present invention.

Moreover, in response to the embodiment of FIG. 4, the signal transmission method of the present invention may further comprises the following steps (as shown in FIG. 8) in addition to the steps of FIG. 6:

Step S810: performing a digital-to-analog conversion to the PAM signal under a calibration mode to thereby generate an analog training signal;

Step S820: under the calibration mode, filtering the analog training signal to thereby generate an analog filtered training signal;

Step S830: under the calibration mode, performing analog-to-digital conversion to the analog filtered training signal to thereby generate a digital filtered training signal;

Step S840: under the calibration mode, generating an equalization signal according to the digital filtered training signal and an error feedback signal in which the equalization signal is associated with at least one equalization parameter which is modified in light of the error feedback signal;

Step S850: under the calibration mode, generating the error feedback signal according to the source signal and the equalization signal; and Step S860: under the calibration mode, updating at least one parameter in accordance with the at least one equalization parameter in which the at least one parameter is the basis for step S610 generating the compensation signal.

Please note that since people of ordinary skill in the art can fully understand the method embodiments of FIG. 6 to FIG. 8 through referring to FIG. 1 to FIG. 4 and the related description thereof, redundant and unnecessary description is thus omitted here, provided that the disclosure and enablement requirements for these method embodiments are still sufficient.

The present invention further discloses a signal reception method capable of offsetting the compensation caused by the corresponding transmission device or method. An embodiment of this signal reception method can be executed by the signal reception device 500 of FIG. 5 or the equivalent device thereof, and comprises the following steps (as shown in FIG. 9):

Step S910: generating a reception signal according to a transmission signal;

Step S920: if the signal level of the reception signal or the derived signal thereof is above a signal level top, lowering the signal level of the reception signal or its derived signal for n×(2M+1) levels to thereby generate a pulse amplitude modulation (PAM) signal in which the n and M are positive integers while the n is adjustable; and Step S930: if the signal level of the reception signal or its derived signal is below a signal level bottom, raising the signal level of the reception signal or its derived signal for n×(2M+1) levels to thereby generate the PAM signal, so that the signal level of the PAM signal will be confined between the signal level top and the signal level bottom.

Figure 5:
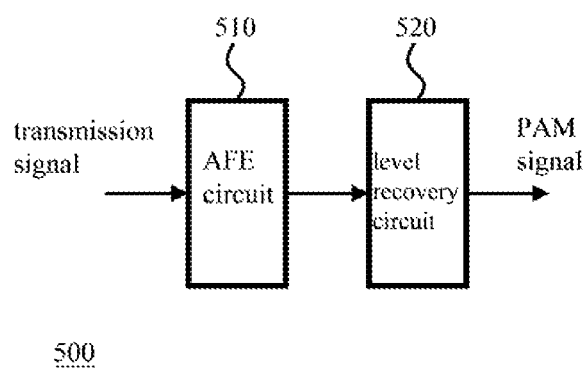
FIG. 5 illustrates an embodiment of the signal reception device offsetting compensation in accordance with the present invention.
Figure 9:
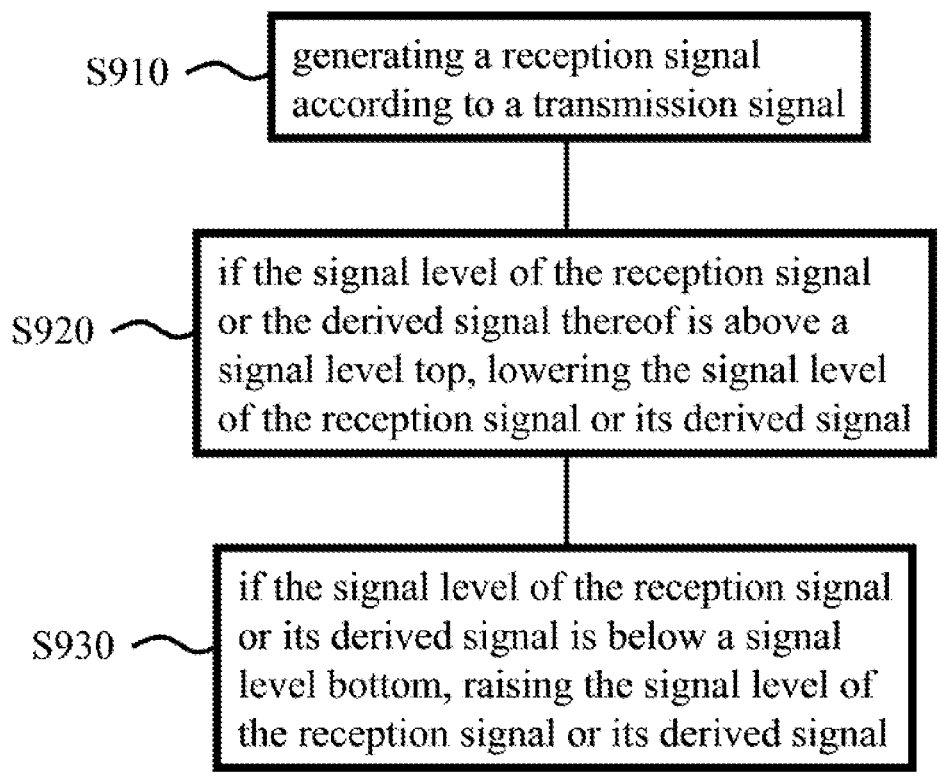
FIG. 9 illustrates the flow chart of an embodiment of the signal reception method offsetting compensation according to the present invention.

Similarly, since people of ordinary skill in the art can fully understand the method embodiment of FIG. 9 through referring to FIG. 5 and its related description, redundant description is therefore omitted, provided that the disclosure and enablement requirements for this method embodiment are still enough. Please note that there is no execution sequence limitation to the steps of FIG. 6 to FIG. 9 unless any sequence limitation is directly or implicitly required by any of the steps.

To sum up, the device and method of the present invention can filter the signal to be transmitted in accordance with specific requirements or a predetermined rule (e.g. an EMI standard), so as to make the waveform and/or frequency spectrum of the signal conform to the requirements or rule; in the mean time, the influence caused by the filtering operation at the signal transmission end is compensated correspondingly while the compensation of the transmission end will be balanced off at the signal reception end accordingly. Therefore, this invention can avoid or reduce the loss of transmission performance such as the transmission distance and throughput under a severe requirement or predetermined rule.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. A signal transmission device performing compensation by filtering characteristics for generating a transmission signal according to a source signal which is a pulse amplitude modulation (PAM) signal, comprising:
    a filtering characteristic compensation circuit to generate a compensation signal according to the source signal and a filtering function, including:
        a calculation circuit to generate a calculation signal according to the PAM signal and a feedback signal;
        a level adjustment circuit, coupled to the calculation circuit, to generate the compensation signal according to the calculation signal in which the signal level of the PAM signal is between a signal level top and a signal level bottom while the level adjustment circuit performs level adjustment to the calculation signal if its signal level is above the signal level top or below the signal level bottom to thereby generate the compensation signal having the signal level between the signal level top and the signal level bottom; and
        a feedback circuit, coupled to the level adjustment circuit, to generate the feedback signal by processing the compensation signal according to a feedback function which is associated with the filtering function; and
    a filter, coupled to the filtering characteristic compensation circuit, to filter the compensation signal according to the filtering function and thereby generate a filtered signal; and
    an analog front-end circuit to generate the transmission signal according to the filtered signal.

2. The signal transmission device performing compensation by filtering characteristics of claim 1, wherein the filtering characteristic compensation circuit includes a Tomlinson-Harashima precoder (THP).

3. The signal transmission device performing compensation by filtering characteristics of claim 1, wherein the calculation circuit subtracts the feedback signal from the PAM signal to thereby generate the calculation signal.

4. The signal transmission device of claim 1, wherein the level adjustment circuit is a modulus operation circuit.

5. The signal transmission device performing compensation by filtering characteristics of claim 1, wherein the signal level of the PAM signal corresponds to one of 2M+1 signal levels; if the signal level of the calculation signal exceeds the signal level top, the level adjustment circuit lowers the signal level of the calculation signal for n×(2M+1) levels to thereby generate the compensation signal; and if the signal level of the calculation signal is below the signal level bottom, the level adjustment circuit raises the signal level of the calculation signal for n×(2M+1) levels to accordingly generate the compensation signal in which the n and the M are positive integers while the n is adjustable.

6. The signal transmission device performing compensation by filtering characteristics of claim 1, wherein the feedback function is equivalent to the filtering function minus 1.

7. The signal transmission device performing compensation by filtering characteristics of claim 1, wherein the feedback function is further associated with a channel estimation function which denotes the influence of a channel effect to the transmission signal, and the filtering characteristic compensation circuit compensates the filtering characteristic of the filter and the influence of the channel effect in accordance with the feedback function to thereby generate the compensation signal.

8. The signal transmission device performing compensation by filtering characteristics of claim 1, further comprising:
a digital-to-analog converter, coupled to the filtering characteristic compensation circuit, to execute digital-to-analog conversion to the compensation signal and output the converted compensation signal to the filter which is an analog filter.

9. The signal transmission device performing compensation by filtering characteristics of claim 1, wherein the analog front-end circuit includes:
a digital-to-analog converter, coupled to the filter, to perform digital-to-analog conversion to the filtered signal, so that the analog front-end circuit generates the transmission signal according to the converted filtered signal in which the filter is a digital filter.

10. A signal transmission device performing compensation by filtering characteristics for generating a transmission signal according to a source signal, comprising:
a filtering characteristic compensation circuit to generate a compensation signal according to the source signal and a filtering function;
a filter, coupled to the filtering characteristic compensation circuit, to filter the compensation signal according to the filtering function and thereby generate a filtered signal;
an analog front-end circuit to generate the transmission signal according to the filtered signal;
a digital-to-analog converter, coupled to the filtering characteristic compensation circuit, to execute digital-to-analog conversion to the compensation signal and output the converted compensation signal to the filter which is an analog filter;
a first switch to electrically connect the source signal with the filtering characteristic compensation circuit under a normal mode and electrically connect the source signal with the digital-to-analog converter under a calibration mode in which the digital-to-analog converter converts the source signal into an analog training signal and sends the analog training signal to the filter under the calibration mode and then the filter generates an analog filtered training signal according to the analog training signal;
a second switch to electrically connect the filter with the analog front-end circuit under the normal mode and electrically connect the filter with an analog-to-digital converter under the calibration mode;
the analog-to-digital converter to convert the analog filtered training signal into a digital filtered training signal under the calibration mode;

an equalizer, coupled to the analog-to-digital converter, to generate an equalization signal according to the digital filtered training signal and an error feedback signal, including at least one equalization parameter which is modified in light of the error feedback signal; and
a decision circuit, coupled to the equalizer and to the source signal through the first switch under the calibration mode, to generate the error feedback signal according to the source signal and the equalization signal under the calibration mode and update at least one parameter of the filtering characteristic compensation circuit according to the modified at least one equalization parameter, so as to calibrate the characteristic offset of the filter.

11. The signal transmission device performing compensation by filtering characteristics of claim 10, wherein the equalizer includes:
a feed-forward equalizer to generate a feed-forward equalization signal according to the digital filtered training signal and the error feedback signal, including at least a feed-forward equalization parameter which is modified according to the error feedback signal; and
a feedback equalizer, coupled to the feed-forward equalizer, to generate the equalization signal according to the feed-forward equalization signal and the error feedback signal, including at least one feedback equalization parameter which is modified according to the error feedback signal,
in which the at least one feed-forward equalization parameter and the at least one feedback equalization parameter constitute the equalization parameter.

12. A signal reception device offsetting compensation, comprising:
an analog front-end circuit to generate a reception signal according to a transmission signal which is compensated previously; and
a level recovery circuit to perform level adjustment to the reception signal or the derived signal thereof which is above a signal level top or below a signal level bottom and thereby generate a pulse amplitude modulation (PAM) signal with a signal level between the signal level top and the signal level bottom,
wherein the signal level of the PAM signal corresponds to one of 2M+1 signal levels; if the signal level of the reception signal or the derived signal thereof exceeds the signal level top, the level recovery circuit lowers the signal level of the reception signal or the derived signal thereof for n×(2M+1) levels; and if the signal level of the reception signal or the derived signal thereof is below the signal level bottom, the level recovery circuit raises the signal level of the reception signal or the derived signal thereof for n×(2M+1) levels in which the n and the M are positive integers while the n is adjustable.

13. The signal reception device offsetting compensation of claim 12, wherein the level recovery circuit is a modulus operation circuit.

14. The signal reception device offsetting compensation of claim 12, further comprising:
a channel equalizer to compensate the influence of a channel effect to the transmission signal, so as to generate the derived signal according to the reception signal.

15. A signal transmission method performing compensation by filtering characteristics, which generates a transmission signal according to a source signal being a pulse amplitude modulation (PAM) signal whose signal level is between a signal level top and a signal level bottom and is carried out through a signal transmission device performing compensation by filtering characteristics, comprising:

generating a compensation signal according to a source signal and a filtering function;

filtering the compensation signal according to the filtering function to thereby generate a filtered signal; and generating the transmission signal according to the filtered signal, wherein the step of generating the compensation signal includes:

generating a calculation signal according to the PAM signal and a feedback signal;

performing level adjustment to the calculation signal if the signal level thereof is above the signal level top or below the signal level bottom to thereby generate the compensation signal, so that the signal level of the compensation signal is set between the signal level top and the signal level bottom; and generating the feedback signal according to the compensation signal and the filtering function.

16. The signal transmission method performing compensation by filtering characteristics of claim 15, wherein the signal level of the PAM signal corresponds to one of 2M+1 signal levels, and the step of generating the compensation signal includes:

if the signal level of the calculation signal is above the signal level top, lowing the signal level of the calculation signal for n×(2M+1) levels to thereby generate the compensation signal; and if the signal level of the calculation signal is below the signal level bottom, raising the signal level of the calculation signal for n×(2M+1) levels to thereby generate the compensation signal, in which the n and the M are positive integers while the n is adjustable.

17. A signal transmission method performing compensation by filtering characteristics, which generates a transmission signal according to a source signal and is carried out through a signal transmission device performing compensation by filtering characteristics, comprising:

generating a compensation signal according to a source signal and a filtering function;

filtering the compensation signal according to the filtering function to thereby generate a filtered signal;

generating the transmission signal according to the filtered signal;

performing digital-to-analog conversion to the source signal under a calibration mode to thereby generate an analog training signal;

under the calibration mode, filtering the analog training signal to thereby generate an analog filtered training signal;

under the calibration mode, performing analog-to-digital conversion to the analog filtered training signal to thereby generate a digital filtered training signal;

under the calibration mode, generating an equalization signal according to the digital filtered training signal and an error feedback signal in which the equalization signal is associated with at least one equalization parameter which is modified in light of the error feedback signal;

under the calibration mode, generating the error feedback signal according to the source signal and the equalization signal; and under the calibration mode, updating at least one parameter in accordance with the at least one equalization parameter in which the at least one parameter is the basis of generating the compensation signal.

18. A signal reception method offsetting compensation, which receives a transmission signal and is carried out by a signal reception device capable of offsetting compensation, comprising:

generating a reception signal according to the transmission signal;

if the signal level of the reception signal or the derived signal thereof is above a signal level top, lowing the signal level of the reception signal or the derived signal thereof for n×(2M+1) levels to thereby generate a pulse amplitude modulation (PAM) signal in which the n and the M are positive integers while the n is adjustable; and if the signal level of the reception signal or the derived signal thereof is below signal level bottom, raising the signal level of the reception signal or the derived signal thereof for n×(2M+1) levels to thereby generate the PAM signal, wherein the signal level of the PAM signal is between the signal level top and the signal level bottom.

* * * * *